United States Patent [19]

Trahan et al.

[11] Patent Number: 4,678,117
[45] Date of Patent: Jul. 7, 1987

[54] TEMPERATURE RESPONSIVE GAS CONTROLLER APPARATUS

[76] Inventors: Wesley J. Trahan, 1818 Julia St.; Albert B. Montandon, 706 Compton St., both of New Iberia, La. 70560

[21] Appl. No.: 859,389

[22] Filed: May 5, 1986

Related U.S. Application Data

[63] Continuation of Ser. No. 664,532, Oct. 25, 1984, abandoned.

[51] Int. Cl.$^4$ ............................................. G05D 27/00
[52] U.S. Cl. .................................. 236/92 A; 137/522; 236/99 G; 267/177
[58] Field of Search .............. 236/92 A, 99 G, 99 R; 267/177; 137/522; 251/321; 62/223

[56] References Cited

U.S. PATENT DOCUMENTS

| | | | |
|---|---|---|---|
| 2,291,503 | 7/1942 | Persons | 236/99 G |
| 2,695,032 | 11/1954 | Kmiecik | 137/522 X |
| 3,181,789 | 5/1965 | Hill | 236/10 |

Primary Examiner—William E. Wayner
Attorney, Agent, or Firm—Pravel, Gambrell, Hewitt, Kimball & Krieger

[57] ABSTRACT

A system working in conjunction with a regulator having a diaphragm for controlling gas pressure within a gas system, wherein there is provided a spring system to control the diaphragm of the regulator, maintaining the regulator at a constant pressure upon adjustment of the spring. There is further provided an actuator mechanism, operating in conjunction with a sensing means comprising a closed cylindrical container containing gas, such as, butane, propane, or the like where upon expansion of the gas due to ambient temperature would activate the actuator mechanism for reducing the spring pressure on the diaphragm, and thus the gas pressure within the system. Likewise, where there is to be a reduction in ambient temperature, the concomitant contraction of a gas within the sensing means, allows increased pressure on the diaphragm for providing increased gas pressure within the regulator.

7 Claims, 4 Drawing Figures

TEMPERATURE RESPONSIVE GAS CONTROLLER APPARATUS

This is a continuation of application Ser. No.: 664,532, filed Oct. 25, 1984, entitled "Temperature Responsive Gas Controller Apparatus", now abandoned.

BACKGROUND OF THE INVENTION

1. Field of the Invention

The apparatus of the present invention relates to temperature responsive control devices. More particularly, the apparatus of the present invention relates to a system in connection with a gas pressure regulator device utilized for controlling the supply of gas from a pumping utility system to a designated area within that system, the control device responsive to changes in weather temperature for controlling the gas pressure within the system.

2. General Background

It is well known in the supply of gas from a public utility system, that the need for gas is directly related to any change in temperature, when a great deal of the gas from the system is utilized for heating homes and the like. Therefore, when a specific district or region which is supplied by a public utility system undergoes a change in weather temperature, for example, when the weather becomes very cold, the demand for gas is increased, and therefore, it is requisitely necessary that the gas pressure within the system be also increased in order to meet this demand. In the present state of the art, it is very common that in attempting to anticipate cold weather approaching a particular district or region, that the regulators which regulate the supply of gas to a certain region, be manually adjusted so that the pressure in the regulator is increased to meet this demand.

Likewise, when warm weather is approaching it is unnecessary to have a high pressure on the system, since this pressure is not needed due to the reduced use of gas in the system; therefore, the regulators again must be manually adjusted so as to effect a reduced pressure supply in the system. Often times, this is a time consuming use of man power in that each regulator must be manually attended throughout the region which may include a number of regulators in order to properly adjust the system, which, of course would lead to a greater possibility of human error being involved in the adjustments which would not necessarily coincide with the pressure needed within the system. Likewise, if the cold weather were to be unanticipated it would be a possibility that the pressure which is in the system could not be adjusted in time, and therefore the loss of pressure within the system could severely affect the supply of gas to be used and could possibly cause an interruption in the flow of gas which would of course endanger the lives of the users were the gas to return into the system.

The type of regulators which are utilized are the type of which are provided with a diaphragm which is controlled in one form of device by means of a weight or like attached to the end of a lever arm for exerting pressure against the diaphragm in opposition to the pressure exerted by the gas supply. In this particular type of regulator, it is common for the utility employees, or the case of the so-called "bottled gas" it is a practice for the service men who deliver the service supplies of gas to make the appropraite changes in the regulator by adding or reducing weight from the lever in accordance with the expected temperatures.

In another form of regulator, a spring system is utilized to control the diaphragm of the regulator but in this case also the regulator will supply gas only at a certain pressure once the spring pressures have been adjusted. The disadvantage of both of these conventional regulators is that, particularly in isolated locations, there is no way in which the adjustment of the regulator may be changed by those unfamilar with the mechanism in response to sudden or unusual changes in weather conditions. Thus, in the winter months it may occur frequently that the gas pressure supply is insufficient to provide proper heating for a building in which the furnace is fired by gas.

There have been several patents issued which relate to regulators and their use in gas supply systems, the most pertinent being as follows:

U.S. Pat. Nos. 2,404,596 issued to Rouche; 3,155,317 issued to Puster; and 3,181,789 issued to Fall, all disclose a combination of a fluid expansable bulb that is temperature responsive and causes a fluid to apply pressure to bellows which through various linkage moves the control valve.

U.S. Pat. Nos. 2,182,873 and 2,309,848 both teach the type of a Fisher-King Valve responding indirectly to temperature and uses gas in the line itself through an orifice to apply pressure to the diaphragm and a pilot relay to feed such pressure to the diaphragm.

SUMMARY OF THE PRESENT INVENTION

The apparatus and system of the present invention solves the problems confronted in the art in a simple and straight forward manner. What is provided is a system working in conjunction with a regulator having a diaphragm for controlling gas pressure within a gas system, wherein there is provided a spring system to control the diaphragm of the regulator, maintaining the regulator at a constant pressure upon adjustment of the spring. There is further provided an actuator mechanism, operating in conjunction with a sensing means comprising a closed cylindrical container containing gas, such as, butane, propane, or the like where upon expansion of the gas due to ambient temperature would activate the actuator mechanism for reducing the spring pressure on the diaphragm, and thus the gas pressure within the system. Likewise, where there is to be a reduction in ambient temperature, the concommitant contraction of a gas within the sensing means, allows increased pressure on the diaphragm for providing increased gas pressure within the regulator. An additional embodiment would include in place of a spring mechanism, the use of weights wherein the actuator mechanism would again reduce the amount of weight on the diaphragm and thus involve less pressure in the system. The loss or reduction of sensing pressure on the actuator mechanism due to contraction of the sensing fluid would likewise increase the force on the diaphragm and thus increase the pressure in the system.

Therefore, it is object of the present invention to provide a mechanism which may be used in combination with the regulator to automatically change the pressure in which the regulator supplies gas to a line or distribution system;

It is a further object of the present invention to provide a regulator mechanism in combination with a sensing mechanism that would be utilized to increase or reduce the pressure within the system;

It is still a further object of the present invention to provide a mechanism whereby the pressure within a gas regulator would be increased or decreased by utilizing a series of weights in conjunction with a sensing mechanism;

It is still a further object of the present invention to provide a system regulating the pressure within a gas regulator wherein the system is a closed system and there is no loss of gas or the like to the outside atmosphere, thus reducing the loss of valuable natural gas or the possibility of contamination of the atomsphere.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein.

DETAILED DESCRIPTION OF THE PREFERRED EMBODIMENT

Figure 1:
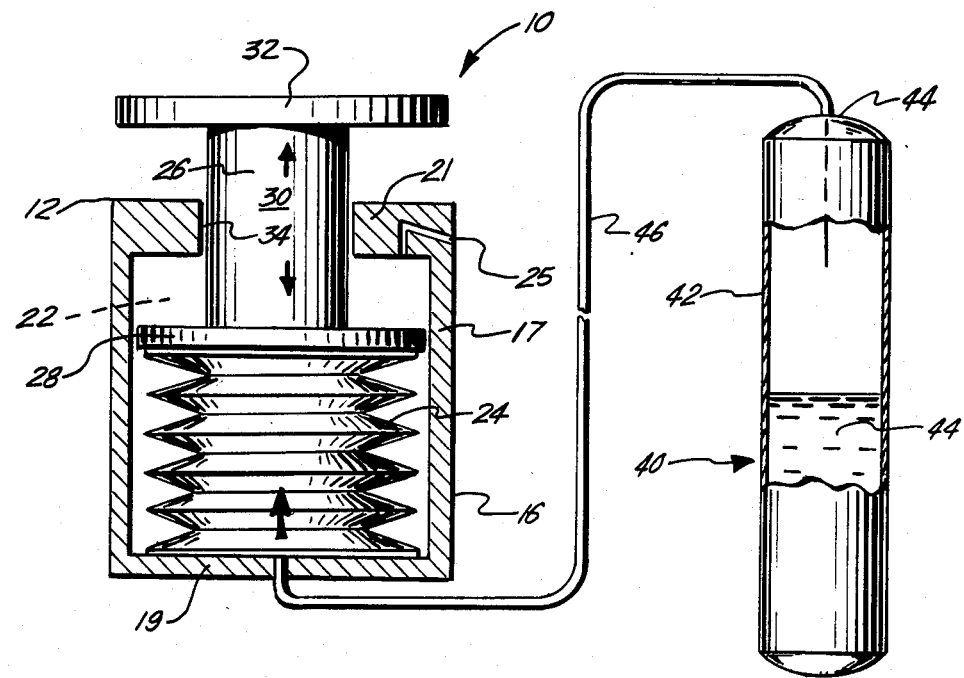
FIG. 1 is a schematic enlarged scale view of the preferred form of the temperature responsive controller of the present invention.
Figure 4:
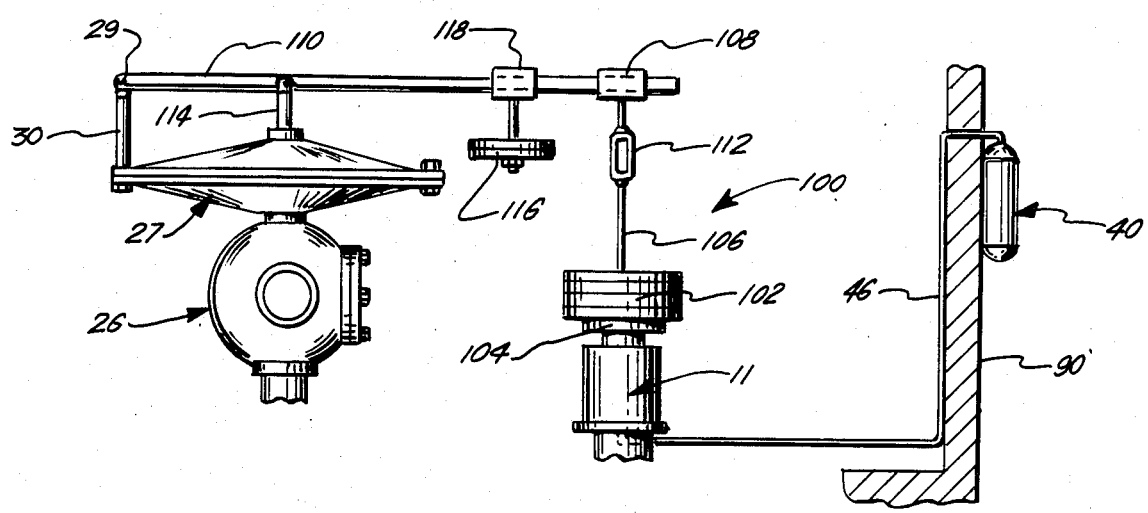
FIG. 4 is a schematic view illustrating an additional embodiment of the entire mechanism in the regulator system illustrating the use of weights in conjunction with the sensing means.
Figure 2:
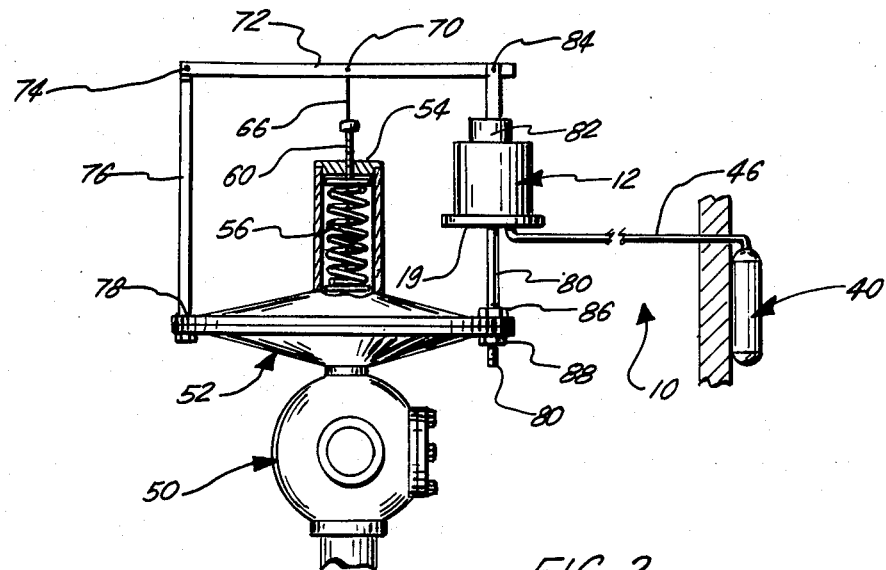
FIG. 2 is a schematic view of the mechanism of the present invention utilizing the spring in conjunction with the sensing means of the present invention.
Figure 3:
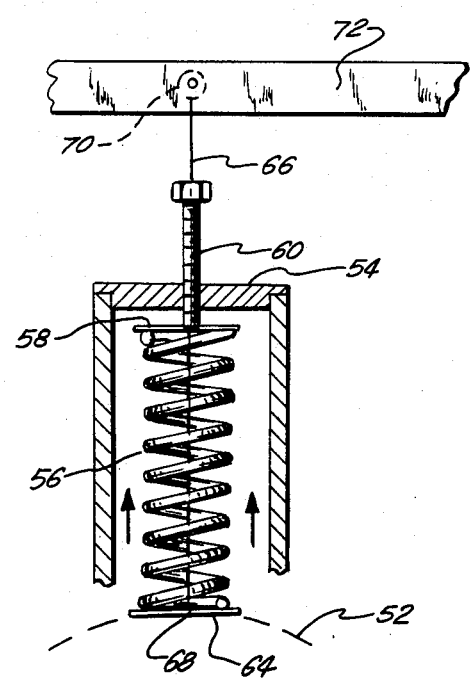
FIG. 3 is a enlarged view of the spring mechanism of the present invention in operation thereof.

FIGS. 1 through 3 illustrate the preferred embodiment of the apparatus of the present invention, with FIG. 4 illustrating an alternative embodiment. As seen in FIGS. 1 through 3, the system is generally designated by a numeral 10. The gas regulator system 10 controlled by a temperature responsive controller means 12 seen in FIG. 1, would comprise an actuator mechanism wherein there is provided a protective housing 16 which would be in effect a closed wall chamber having a continuous side wall 17, bottom portion 19, and upper top portion 21 for defining a chamber 22 therewithin. Chamber 22 would contain expandable chamber means 24, which would be preferably metal or the like such, as an expandable bellows for receiving fluid there within. Expandable chamber means 24 would further comprise vertically disposed piston 26 having a lower face member 28 attached to the top portion of expandable chamber means 24, a piston body 30 attached to upper piston head 32, with vertical piston body 30 housed within vertical bore 34 so that upper and downward movement of expandable bellows 24 imparts like movement to piston 26.

As seen in the FIGURES, there is further provided sensing means 40 which comprises a closed cylinder shaped container 42 exposed to the outside air, i.e., ambient temperature, containing a volatile fluid such as butane, protane, or the like gas, in liquid form 44 which is responsive to changes in ambient temperature wherein the gas could be bled out of chamber 42 via capillary tubing 46 at outlet port 47 with capillary tubing 46 entering the floor portion 19 of chamber means 24 and allowing gas to enter expandable chamber means 24 via inlet port 27 as seen in FIG. 1. Temperature responsive controller means mechanism 12 further comprises a bleed port 25 for bleeding air within chamber 22 during the upward expansion of expandable bellows 24.

In further explaining the function of temperature response controller 12, reference is made to the complete system 10 as indicated in FIG. 2. In FIG. 2, in the preferred embodiment, there is provided a regulator valve 50 which contains natural gas under pressure for feeding into a region or section of a city or town. In order to control the pressure within the system, there is further provided a diaphragm means 52 which is a flexible wall member within the regulator valve which under response flexes upward and downward and thus the control of the position of diaphragm member 52 would necessarily control the amount of pressure within the system from regulator valve 50. As seen in FIG. 2, diaphragm member 52 would further comprise upper vertically aligned housing 54 which contain therein spring member 56 whereby, depending on the amount of force imparted by spring member 56 onto diaphragm 52, would control the amount of pressure within the system.

As seen in detail in FIG. 3, spring member 56 would have a first upper plate member 58 resting on its top portion with a bolt 60 threadable into the upper portion housing 54 and putting direct pressure onto plate 58 as bolt 60 is threaded downward. Such pressure on plate 58 would likewise impart greater force upon spring 56 and thus additional pressure on diaphragm member 52. Thus, the direct threading of bolt 60 could be adjusted the maximum pressure of the system imparted directly by spring 56. In order to achieve the result of reducing force on diaphragm 52 there is further provided free floating lower plate member 64 which is set directly intermediate the bottom portion of the spring member 56 and the top portion of diaphragm 52. Plate member 64 upon being lifted away from diaphragm member 52 would thus reduce the force spring 56 is imparting upon diaphragm member 52 and thus will reduce the pressure in the system. This is accomplished via wire member 66 which would extend through an internal bore 67 through bolt 60 downward to a direct connection onto plate 64 via a hook member 68 or the like as seen in FIG. 3. The upper end of wire 66 would be tied directly into a bore 70 of transverse arm member 72. As seen in FIG. 2, transverse arm member 72 would be pivotally linked on a first end 74 to upright stationary member 76 which is securely mounted onto diaphragm member 52 or a suitable mounting at 78. Therefore, any upward movement of transverse arm 72 would likewise impart a pull on bottom plate member 64 thus reducing pressure on diaphragm member 52.

This is accomplished via temperature response control means 12 as was discussed in FIG. 1. As seen in FIG. 2, response controller means 12 is mounted so that a rod member 80 connected directly to floor 19 of response controller means 12 on its bottom portion and a upper support member 82 is pivotally linked to the second end 84 of transverse arm 72. As seen in the FIGURES rod member 80 is bolted via adjustable nut members 86 and 88 respectively so that the initial position of transverse arm 72 can be secured to set the minimum pressure at the desired amount, depending on the type of regulator being utilized. As was seen from the structure in FIG. 1, since rod member 82 is directly linked onto piston 26, any movement up or down of piston 26 would impart upward or downward movement of transverse arm 72 and thus impart contraction or expansion of spring member 56 for effecting the pressure on diaphragm 52.

Therefore, in operation, upon any temperature, for example, an increase in temperature upon sensing means 40 which would be mounted exterior onto wall 90 as seen in FIG. 2, gas such as butane contained within sensor means 40 would expand thus traveling through capillary tube 46 and into expandable bellows 24 for imparting expansion of bellows 24 and thus upward movement of piston member 26. Likewise, the upward movement of piston member 26 would impart upward movement to transverse arm 72 thus pulling wire means 66 to exert upward pull to lower plate 64 and putting greater force on the bottom of spring 56 and recoiling it whereby releasing pressure on diaphragm 52 and thus reducing the pressure in the system. Likewise, when the ambient temperature would be reduced, the gas would contract, reduce the pressure on bellows 24, lower piston 26, lower transverse lever 72, thereby allowing spring 56 to impart full force onto diaphragm 52 to increase the pressure in the system. The overall benefits of this of course is that as the ambient temperature rises there is necessarily reduced need for gas force and, therefore, because the sensing means 10 allow less pressure to be placed on diaphragm 52, then the pressure is likewise reduced to the system. On the other hand when the ambient temperature is reduced, the gas within cylinder 42 would contact causing piston 26 to move downward and thus increasing the force on diaphragm 52 and increasing the gas pressure in the system for accommodating the decrease in ambient temperature.

It should be noted that the automatic operation of the system, responding to changes in temperature, enables it to be a system which is self-contained and fail-safe. If, for example, there would be a loss or interruption of sensing fluid, i.e., butane to chamber 24, this loss of the sensing fluid would have no effect on the overall operation of the system since spring 56 would place the system on the maximum pressure, rather than no pressure or very little pressure. Although maximum pressure is not always needed, it is preferable to a loss of pressure in the system, until the sensor can be attended to.

FIG. 4 would present an additional embodiment of the apparatus of the present invention utilizing a series of weights as opposed to the spring mechanism. As shown in FIG. 4, actuator system 100 is mounted conveniently on a support not shown with one or more weighted discs 102 supported on the upper piston head 104 and also connected by rod 106 and a bracket 108 to the free end of transverse rod 110. Adjustment of the length of the rod 106 may be provided by means of a turnbuckle 112. However, sensing unit 40 will be appropriately mounted on the outside of an exterior wall as indicated or on a special support so that the container 40 will be exposed to the temperature of the outside air.

Communication would be maintained as in the preferred embodiment between the volatile gas 44 in container 42 and the actuator 12 through the capillary tubing 46 which extends through an appropriate opening in the wall or through the underground conduit for connection for the actuator mechanism 12. The most striking difference between the embodiment as seen in FIGS. 2 and 3 is that the embodiment utilizing the weights has no spring mechanism 56 for imparting pressure onto diaphragm 52. This pressure is parted directly from lever transverse 110 via vertically inclined lever 114 onto diaphragm 52. Thus, wherein in the preferred embodiment the spring mechanism 56 imparted downward forced onto diaphragm 52 via the threading of bolt 60, and this particular embodiment, the number of weights 102 directly placed onto piston head 104 would serve as the maximum pressure, with the slideable weight member 116 along transverse rod 110, via bracket 118, would serve to function as the minimum pressure of the system.

In the operation of this embodiment of the invention it would be assumed that an upward movement of lever 110 of the regulator valve so would reduce pressure exerted on diaphragm mechanism 52. This would result in a reduction in pressure in gas supplied by the system. Therefore, if there is a reduction in the temperature of the outside atmosphere, there would be a consequent tendency for condensation of the butane or the like contained within the container 42, and a consequent reduction of the pressure exerted through the capillary tubing 46 against the interior of the bellows 24. As a result, the upward force of the piston 30 against the weight 110 and the lever 112 will be effectively reduced and this will be equivalent to the addition of additional weights when the lever 110 or movement of the weight 104 toward the right. The net result will be to tend to move 110 downward increasing the force exserted on the diaphragm to increase the pressure which the regulator valve will supply gas to whatever system it is connected whether it comprises a single burner or an entire regional system. On the other hand, an increase in the outside temperature will increase the pressure of the gas and the sensing means, tending to raise lever 104 to reduce the pressure which the regulator will furnish gas.

What is claimed as invention is:

1. An apparatus responsive to a change in ambiant temperature, for regulating the pressure of gas within a gas pressure regulator of the type having a gas supply means, including a gas inlet and a gas outlet, said gas supply means further including a flexible diaphram member housed in the gas supply means movable between a first position for achieving maximum pressure within the system, and a second position for achieving the minimum pressure within the system, the apparatus comprising:
   a. spring means including a base associated with the diaphram member for normally maintaining the diaphram member in the first position achieving the maximum pressure within the system;
   b. means for contracting the spring to move the diaphram member toward a position to decrease the pressure within the system, said means further comprising:
      i. sensing means, including a fluid expandable through an increase in ambiant temperature;
      ii. a piston member receiving a fluid from said sensing means and movable upward in response to the expanse of said gas;
      iii. a lever member, connectable on a first end to said piston member and movable in conjunction with said piston member; and
      iv. means extending between an arm member and the base of the spring member, so that upon movement of the arm member to the up position in response to the upward movement of the piston member, the base of the spring is pulled in the up direction, imparting movement of the diaphram toward the second position decreasing the pressure in the system, and upon the arm member returning to the down position, the spring member returns to its normal first position for achieving the maximum pressure within the system.

2. The apparatus in claim 1, wherein said sensing means further includes a container for said expandable fluid which is situated in the ambiant atmosphere.

3. The apparatus in claim 1, wherein there is further provided a housing enclosing said spring member, the housing further including a screw in the upper portion of the housing rigidly contacting the upper portion of the spring member in a pre-set position establishing the maximum pressure in the system when the spring is in the first position.

4. An apparatus responsive to a change in ambiant temperature, for regulating the pressure of gas within a gas pressure regulator of the type having a gas supply means, including a gas inlet and a gas outlet, said gas supply means further including a flexible diaphram member housed in the gas supply means movable between a first position for acheiving maximum pressure within the system, and a second position for acheiving the minimum pressure within the system, the apparatus comprising:
   a. a spring member cooperating with the flexible diaphram member;
   b. an arm hingedly mounted its first end and movable between up and down positions at its second end;
   c. a piston member attachable to the movable end of the mounting arm;
   d. sensing means, including a gas expandable upon the increase in ambiant temperature;
   e. means for supplying the expandable gas into the piston chamber for moving the piston to the up position and likewise moving the arm member to the up position; and
   f. means extending between the arm member and the base of the spring member, so that upon movement of the arm member toward the up position in response to the upward movement of the piston member, the base of the spring is pulled upwardly, imparting movement of the diaphram member toward the second position decreasing the pressure in the system, and upon the arm member moving toward the down position, the spring member returns to its normal position for acheiving the maximum pressure within the system.

5. The apparatus in claim 4, wherein the means interconnecting the spring and the arm further comprises a wire connected to substantially the central portion of the arm member to the bottom portion of the spring for pulling the bottom portion of the spring upwardly further expanding the diaphram member, as the arm is moved to the up position.

6. The apparatus in claim 4, wherein there is further provided a housing closing the spring member, the housing further including a screw to the upper portion of the housing for rigidly threading the position of the top portion of the spring member immovable against the force of the screw member.

7. A temperature responsive gas controlled apparatus, for regulating the pressure of gas within a gas pressure regulator of the type having a gas supply means including a gas inlet and a gas outlet, the gas supply means further including a flexible diaphram member housed in the gas supply means movable between a first position for increasing the pressure within the gas supply means and a second position for decreasing the pressure and the gas supply means, the apparatus comprising:
   a. spring means associated with the diaphram member within the gas supply means for normally maintaining the diaphram member in the first position, maintaining maximum pressure in the system, and contractable to a position for allowing the diaphram member to move to the second position for reducing the pressure in the system;
   b. means attachable to said spring member for moving said spring member to the contracted position; and
   c. sensing means, responsive to a change in ambiant temperature, for providing an expandable fluid to exert force upon the means connected to the spring means for contracting said spring means when the gas is expanded in the sensing means, and for allowing the spring to return to the down position when the gas is contracted in the sensing means, returning the system to a maximum pressure.

* * * * *